(12) United States Patent
Lokkart

(10) Patent No.: US 11,573,751 B2
(45) Date of Patent: Feb. 7, 2023

(54) METHOD AND SYSTEM FOR PRECISE PLACEMENT

(71) Applicant: HOMER T. HAYWARD LUMBER CO., Monterey, CA (US)

(72) Inventor: Rudi H. Lokkart, Arroyo Grande, CA (US)

(73) Assignee: HOMER T. HAYWARD LUMBER CO., Monterey, CA (US)

( * ) Notice: Subject to any disclaimer, the term of this patent is extended or adjusted under 35 U.S.C. 154(b) by 0 days.

(21) Appl. No.: 17/584,172

(22) Filed: Jan. 25, 2022

(65) Prior Publication Data
US 2022/0143995 A1    May 12, 2022

Related U.S. Application Data

(63) Continuation of application No. 16/942,407, filed on Jul. 29, 2020, now Pat. No. 11,262,955, which is a continuation of application No. 16/399,830, filed on Apr. 30, 2019, now Pat. No. 10,761,785.

(60) Provisional application No. 62/773,949, filed on Nov. 30, 2018.

(51) Int. Cl.
*B41J 29/393* (2006.01)
*G06F 3/12* (2006.01)
*B41J 3/62* (2006.01)

(52) U.S. Cl.
CPC ............ *G06F 3/121* (2013.01); *B41J 3/62* (2013.01); *G06F 3/1208* (2013.01); *G06F 3/1234* (2013.01); *G06F 3/1281* (2013.01)

(58) Field of Classification Search
CPC ...... G06F 3/121; G06F 3/1208; G06F 3/1234; G06F 3/1281; B41J 3/62
See application file for complete search history.

(56) References Cited

U.S. PATENT DOCUMENTS

| 7,564,020 | B2 |   | 7/2009  | Sergyeyenko |
|-----------|----|---|---------|-------------|
| 9,739,880 | B2 | * | 8/2017  | Feigin ................. G01S 13/885 |
| 9,849,494 | B2 |   | 12/2017 | Plummer et al. |

(Continued)

FOREIGN PATENT DOCUMENTS

| WO | 2016178453 A1 | 11/2016 |
| WO | 2017093779 A1 | 6/2017  |

OTHER PUBLICATIONS

Szelqg, M., et al., "Bim in General Construction," 2017, pp. 1-197, Lublin University of Technology, Lublin, Poland.

(Continued)

*Primary Examiner* — Quang N Vo
(74) *Attorney, Agent, or Firm* — Sherman IP LLP; Kenneth L. Sherman; Hemavathy Perumal

(57) ABSTRACT

One embodiment provides a device comprising at least one movable unit, at least one sensor, a printer, at least one processor, and a non-transitory processor-readable memory device storing instructions that when executed by the at least one processor causes the at least one processor to perform operations. The operations include receiving layout and design information, receiving, from the at least one sensor, contextual information indicative that the at least one movable unit is in direct contact with a surface, and triggering the printer to print one or more markings on the surface as the at least one movable unit moves along the surface based on the layout and design information.

20 Claims, 7 Drawing Sheets

(56) References Cited

U.S. PATENT DOCUMENTS

2006/0075718 A1    4/2006  Borne et al.
2007/0107241 A1*  5/2007  Sergyeyenko ....... G01C 15/006
                                                              33/290

OTHER PUBLICATIONS

U.S. Non-Final Office Action for U.S. Appl. No. 16/399,830 dated Dec. 11, 2019.
U.S. Notice of Allowance for U.S. Appl. No. 16/399,830 dated May 12, 2020.
U.S. Non-Final Office Action for U.S. Appl. No. 16/942,407 dated Jul. 20, 2021.
U.S. Notice of Allowance for U.S. Appl. No. 16/942,407 dated Oct. 25, 2021.

* cited by examiner

METHOD AND SYSTEM FOR PRECISE PLACEMENT

CROSS REFERENCE TO RELATED APPLICATIONS

The present application is a continuation of and claims priority to U.S. patent application Ser. No. 16/942,407, filed on Jul. 29, 2020, which in turn claims priority to U.S. patent application Ser. No. 16/399,830, filed on Apr. 30, 2019, which in turn claims priority to U.S. Provisional Patent Application Ser. No. 62/773,949, filed on Nov. 30, 2018, all incorporated herein by reference.

TECHNICAL FIELD

One or more embodiments generally relate to building information modeling (BIM), in particular, a method and system for precise placement.

BACKGROUND

Prefabrication is the practice of assembling components of a structure in a factory or other manufacturing site, and transporting complete assemblies or sub-assemblies to the construction site where the structure is to be located.

SUMMARY

One embodiment provides a device comprising at least one movable unit, at least one sensor, a printer, at least one processor, and a non-transitory processor-readable memory device storing instructions that when executed by the at least one processor causes the at least one processor to perform operations. The operations include receiving layout and design information, receiving, from the at least one sensor, contextual information indicative that the at least one movable unit is in direct contact with a surface, and triggering the printer to print one or more markings on the surface as the at least one movable unit moves along the surface based on the layout and design information.

Another embodiment provides a method comprising receiving layout and design information, receiving, from at least one sensor of a device, contextual information indicative that at least one movable unit of the device is in direct contact with a surface, and triggering a printer of the device to print one or more markings on the surface as the at least one movable unit moves along the surface based on the layout and design information.

One embodiment provides a non-transitory processor-readable medium that includes a program that when executed by a processor performing a method comprising receiving layout and design information, receiving, from at least one sensor of a device, contextual information indicative that at least one movable unit of the device is in direct contact with a surface, and triggering a printer of the device to print one or more markings on the surface as the at least one movable unit moves along the surface based on the layout and design information.

These and other aspects and advantages of one or more embodiments will become apparent from the following detailed description, which, when taken in conjunction with the drawings, illustrate by way of example the principles of the one or more embodiments.

BRIEF DESCRIPTION OF THE DRAWINGS

For a fuller understanding of the nature and advantages of the embodiments, as well as a preferred mode of use, reference should be made to the following detailed description read in conjunction with the accompanying drawings, in which.

DETAILED DESCRIPTION

Figure 1:
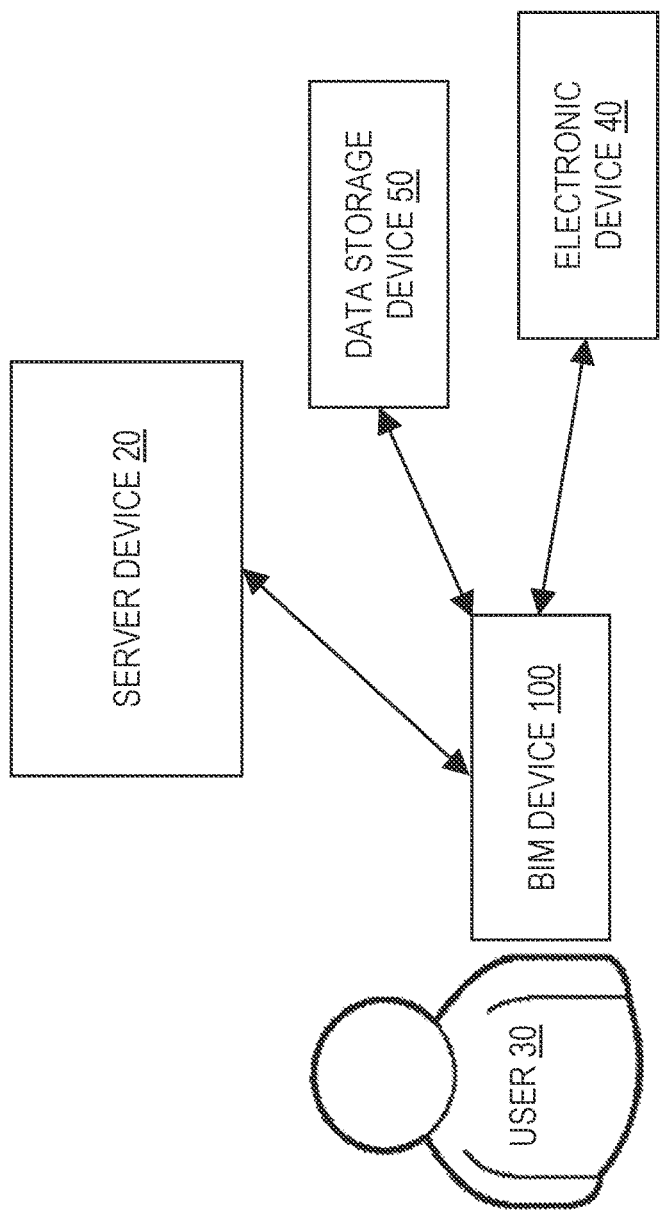
FIG. 1 illustrates an example portable handheld building information modeling (BIM) device for precise placement, in one or more embodiments.

The following description is made for the purpose of illustrating the general principles of one or more embodiments and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

One or more embodiments generally relate to voice command devices, in particular, a method and system for emergent multi-modal interaction with intelligent assistants in voice command devices. One embodiment provides a device comprising at least one movable unit, at least one sensor, a printer, at least one processor, and a non-transitory processor-readable memory device storing instructions that when executed by the at least one processor causes the at least one processor to perform operations. The operations include receiving layout and design information, receiving, from the at least one sensor, contextual information indicative that the at least one movable unit is in direct contact with a surface, and triggering the printer to print one or more markings on the surface as the at least one movable unit moves along the surface based on the layout and design information.

Another embodiment provides a method comprising receiving layout and design information, receiving, from at least one sensor of a device, contextual information indicative that at least one movable unit of the device is in direct contact with a surface, and triggering a printer of the device to print one or more markings on the surface as the at least one movable unit moves along the surface based on the layout and design information.

One embodiment provides a non-transitory processor-readable medium that includes a program that when executed by a processor performing a method comprising receiving layout and design information, receiving, from at least one sensor of a device, contextual information indicative that at least one movable unit of the device is in direct contact with a surface, and triggering a printer of the device to print one or more markings on the surface as the at least one movable unit moves along the surface based on the layout and design information.

BIM (Building Information Modeling) is a model-based process that gives architecture, engineering, and construction professionals insight and tools to more efficiently plan, design, construct, and manage buildings and infrastructure.

For expository purposes, the term "field assembled walls" as used in this specification generally refers to wall panels assembled onsite.

For expository purposes, the term "electronic device" as used in this specification generally refers to any type of electronic device such as, but not limited to, desktop computers, laptops, smart phones, tablets, etc.

In recent times, it has become increasingly common for wall panels for use in wood frame construction projects to be assembled offsite in a factory or a similar manufacturing setting. Wall panels assembled offsite are designed and assembled on computer numeric control (CNC) equipment to exact tolerances, and are often produced faster and significantly cheaper than wall panels assembled onsite (i.e., at the construction site where the wood frame construction project is located) by construction carpenters.

For expository purposes, the term "precise placement" as used in this specification generally refers to embedding/installing one or more pieces of anchoring hardware (e.g., anchor bolts, hold down devices, straps, and other types of construction elements) accurately/precisely on a surface to support a structure (e.g., a wall).

For a wall panel system to work efficiently, fully assembled walls require accurate/precise placement/positioning of anchoring hardware embedded in concrete to support the walls. Presently, field installation of anchoring hardware (i.e., installation of anchoring hardware onsite) is accomplished in a very rudimentary way using tape measure, strings, and any number of manual marking systems to locate the anchoring hardware prior to pouring of concrete in which the anchoring hardware will be embedded. Such conventional solutions are prone to error and inaccuracy.

Unlike field assembled walls, fully assembled walls do not allow for adjustments or adjustments to be made with ease. For example, utilizing fully assembled walls prevents shifting of a window or a door about a ¼ inch to fit between anchor bolts embedded in concrete that were not placed/positioned correctly. The anchor bolts will need to be removed from the concrete (e.g., by cutting the anchor bolts off), new holes for new anchor bolts drilled at correct locations in the concrete, and the new anchor bolts epoxied at the correct locations. This is a large and costly solution often requiring field inspection by an engineer during the epoxy phase to ensure process conformance. Further, if a new anchor bolt needs to be positioned/placed from a removed anchor bolt at about a distance of less than a diameter of the removed anchor bolt, it is not possible to drill a clean hole for the new anchor bolt because a correct location for the new anchor bolts overlaps with the removed anchor bolt. Alternatively, the fully assembled walls themselves can be modified including stud nails being cut and window/door assembly materials (e.g., king studs, trimmers, header, & sills) being shifted left or right to fit the misplaced anchor bolts. However, this alternative solution is also involved and time consuming. For example, if a fully assembled wall comprises shear plywood skin, wood members of the wall may become destroyed as the wall is modified as shear nailing is typically about 2 inches on center.

One or more embodiments generally relate to building information modeling (BIM), in particular, a method and system for precise placement. One or more embodiments of the inventions are applicable to types of construction projects, such as wood frame construction projects. One embodiment of the invention provides a portable handheld BIM device for precise placement.

Figure 2:
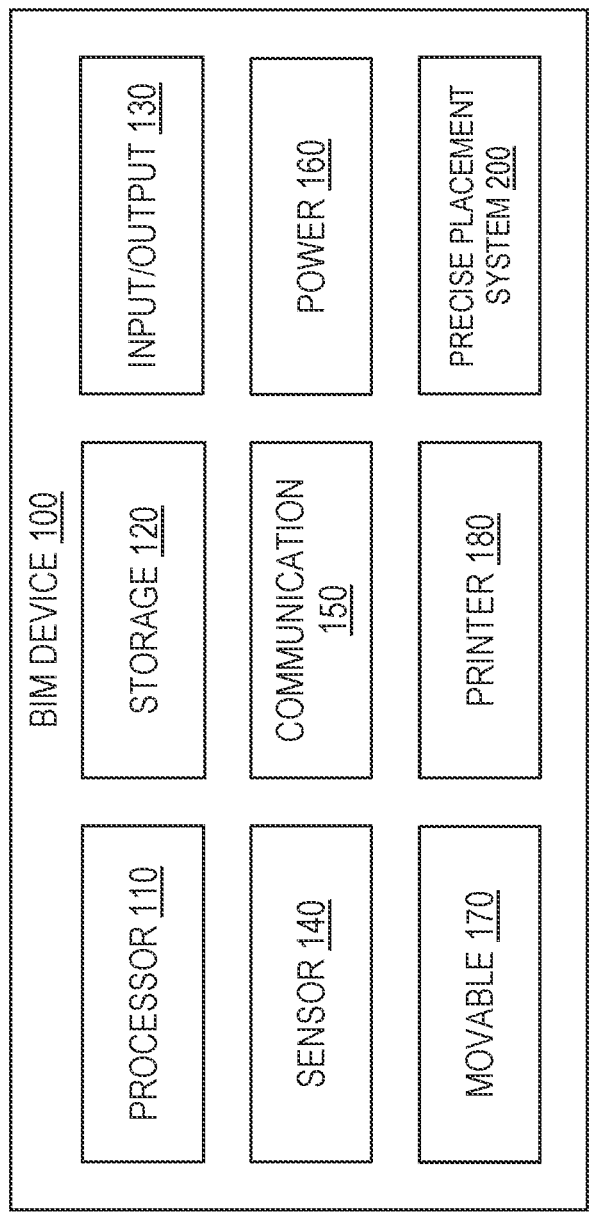
FIG. 2 illustrates example components of the portable handheld BIM device, in one or more embodiments.

FIG. 1 illustrates an example portable handheld BIM device 100 for precise placement, in one or more embodiments. FIG. 2 illustrates example components of the portable handheld BIM device 100, in one or more embodiments. In one embodiment, the BIM device 100 comprises computing resources, such as one or more processor units 110 and one or more storage units 120. In one embodiment, the BIM device 100 comprises a housing 100A (FIG. 4A) configured to maintain one or more components of the BIM device 100 (e.g., the computing resources).

In one embodiment, the BIM device 100 comprises a printer unit 180 configured to print. The printer unit 180 comprises, but is not limited to, one of the following types of printer: an inkjet printhead 180A (FIG. 4A), a strip printer, etc.

Figure 4B:
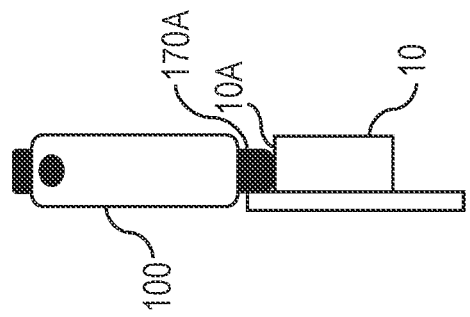
FIG. 4B illustrates a front view of the example BIM device, in one or more embodiments.
Figure 4A:
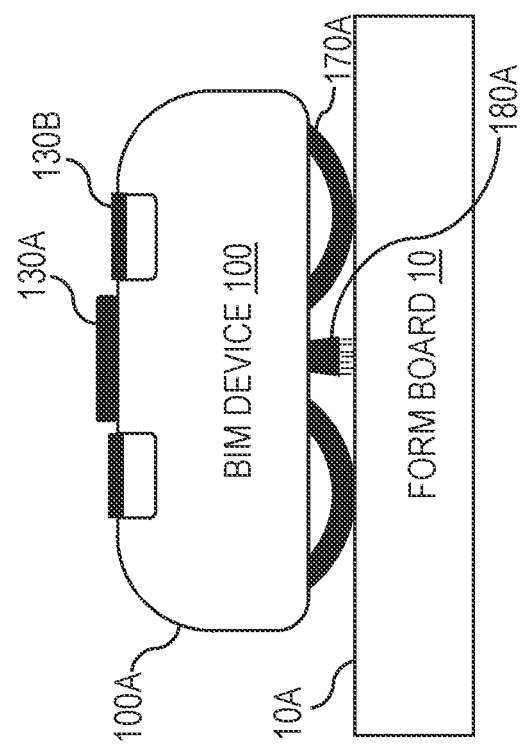
FIG. 4A illustrates a side view of an example BIM device, in one or more embodiments.

In one embodiment, the BIM device 100 comprises one or more movable units 170 configured to move the BIM device 100 along a surface. In one embodiment, the one or more movable units 170 comprise one or more rotatable or slidable units configured to roll or slide the BIM device 100 along a surface. For example, in one embodiment, the one or more movable units 170 comprises a plurality of roller wheels 170A (FIG. 4A) designed to roll along a surface (e.g., a top edge 10A of a form board 10, such as a concrete form board, as shown in FIG. 4A) when the BIM device 100 is placed/positioned directly on top of the surface and the BIM device 100 is triggered to physically move along the surface via handheld movement by a user 30.

In one embodiment, the housing 100A is designed/shaped for handheld movement by a user 30. A user 30 can control physical movement of the BIM device 100 by mechanically/physically interacting with a portion of the housing 100A. For example, a user 30 can control the BIM device 100 to physically move along a desired path (e.g., a linear path) on a surface by applying hand/finger pressure to a portion of the housing 100A to roll the BIM device 100 over the surface via the roller wheels 170A.

In one embodiment, each roller wheel 170A is wrapped in rubber or another type of material suitable for rolling and to reduce slippage. In one embodiment, the printer unit 180 is disposed/housed suspended in between the roller wheels 170A, as shown in FIG. 4A.

As another example, in one embodiment, the one or more movable units 170 comprise a rotatable sliding base.

In one embodiment, the BIM device 100 has at least the following operating modes: (1) a print mode during which the printer unit 180 is activated for printing, and (2) a non-print mode during which the printer unit 180 is not activated for printing.

One or more software applications may execute/operate on the BIM device 100 utilizing the resources of the BIM device 100. In one embodiment, the one or more software applications include, but are not limited to, a precise placement system 200 configured to control printing of the printer unit 180 based on layout and design information and contextual information relating to the BIM device 100.

In one embodiment, the BIM device 100 comprises one or more input/output (I/O) units 130 integrated in or coupled to the BIM device 100. In one embodiment, the one or more I/O units 130 include, but are not limited to, a physical user interface (PUI) and/or a graphical user interface (GUI), such as a keyboard, a keypad, a touch interface, a knob, a button, a display screen 130A (FIG. 4A), an input port 130B (FIG. 4A) for connecting with a plug-and-play portable storage device 50 (e.g., a Universal Serial Bus (USB) port for connecting to a USB flash drive (i.e., a thumb drive) or another type of USB storage device), an indicator light, a haptic feedback device, an audio reproduction device (e.g., a speaker), etc. In one embodiment, a user 30 can utilize at least one I/O unit 130 to configure one or more user preferences, configure one or more parameters (e.g., user permissions), provide input (e.g., user selection of operating mode, desired layout and design information), etc.

In one embodiment, the BIM device 100 comprises a communications unit 150 configured to exchange data with one or more server devices 20 and/or one or more electronic device 40 over a communications network/connection (e.g., a wireless connection such as a Wi-Fi connection or a cellular data connection, a wired connection, or a combination of the two). The communications unit 150 may comprise any suitable communications circuitry operative to connect to a communications network (e.g., communications network 40) and to exchange communications operations and media from the BIM device 100 to other devices connected to the communications network. The communications unit 150 may be operative to interface with the communications network using any suitable communications protocol such as, for example, Wi-Fi (e.g., an IEEE 802.11 protocol), Bluetooth®, high frequency systems (e.g., 900 MHz, 2.4 GHz, and 5.6 GHz communication systems), infrared, GSM, GSM plus EDGE, CDMA, quadband, and other cellular protocols, VOIP, TCP-IP, or any other suitable protocol.

For example, a server device 20 may comprise a remote server (e.g., a computer, device, or program that manages network resources, etc.) providing an online platform for hosting one or more online services (e.g., an online BIM service, etc.) and/or distributing one or more software mobile applications. As another example, the precise placement system 200 and/or software updates for the precise placement system 200 may be loaded onto or downloaded to the BIM device 100 from a digital distribution service (e.g., Google Play, the App Store, etc.) operating on a server device 20. As yet another example, a server device 20 may comprise a cloud computing environment providing shared pools of configurable computing system resources and higher-level services (e.g., a BIM cloud application).

Examples of an electronic device 40 include, but are not limited to, a desktop computer, a mobile electronic device (e.g., a tablet, a smart phone, a laptop, etc.), a wearable device (e.g., a smart watch, etc.), an Internet of Things (IoT) device, etc.

In one embodiment, the precise placement system 200 may be pre-loaded onto the MINI device 100.

In one embodiment, the BIM device 100 comprises one or more sensor units 140 integrated in or coupled to the BIM device 100, such as a camera, a proximity sensor, a laser (e.g., for laser measurement, laser balancing, laser leveling, and/or any other laser technology), a microphone, a GPS, etc. A sensor unit 140 may be utilized to capture content and/or sensor-based contextual information. An application on the BIM device 100 may utilize at least one sensor unit 140 to capture sensor-based contextual information, such as a microphone for audio data (e.g., voice commands from a user 30 utilizing the BIM device 100, etc.), a camera for image data (e.g., still and/or video images of an environment surrounding the BIM device 100, etc.), a GPS for location data (e.g., location coordinates of the BIM device 100), etc. For example, the precise placement system 500 may utilize a proximity sensor to detect when the BIM device 100 is positioned on top of a surface. As another example, the precise placement system 500 may utilize a camera to capture an image of an object to be marked (e.g., a wall) or an image of an entire structure. As yet another example, the precise placement system 500 may utilize a GPS to determine location coordinates of the BIM device 100 for accuracy and to support future development of technology.

In one embodiment, if the BIM device 100 is in the non-print mode, the precise placement system 200 is configured to receive an input file comprising layout and design information relating to a structure (e.g., a fully assembled wall). In one embodiment, the layout and design information comprises data indicative of a precise placement of each piece of anchoring hardware required to anchor and support the structure. In one embodiment, the input file is generated by a software application (e.g., a BIM application) used to design the structure.

In one embodiment, an input file is received from a server device 20, an electronic device 40, or a plug-and-play portable storage device 50 connected to the BIM device 100.

In one embodiment, an input file may be stored on the one or more storage units 120. A user 30 can save one or more input files (e.g., reusable input files available for repeated use in multiple projects, such as production housing applications) to, and select an input file from, the one or more storage units 120.

In one embodiment, a user 30 can utilize the one or more I/O units 130 of the BIM device 100 to view an object to be marked (via the printer unit 180) and/or select an object to be marked. For example, a display screen of the BIM device 100 may display an image (e.g., captured by a camera of the BIM device 100) of a wall to be marked or an image of an entire structure. If an image of an entire structure is displayed, the BIM device 100 can provide a GUI that the user 30 can interact with (e.g., via a touch interface) to select a component of the entire structure, such as a wall, to mark.

In one embodiment, the precise placement system 200 is configured to exchange data with a companion software application (e.g., a companion mobile app) loaded onto or downloaded to an electronic device 40. A user 30 may utilize the companion software application to view data (e.g., an object to be marked) and/or provide user input (e.g., user selection of a component of an entire structure to be marked).

In one embodiment, the one or more software applications on the BIM device 100 may further include one or more software mobile applications loaded onto or downloaded to the BIM device 100, such as a messaging application, a camera application, a social media application, etc. A software mobile application on the BIM device 100 may exchange data with the precise placement system 200.

In one embodiment, the BIM device 100 comprises a power unit 160 configured to supply power to one or more other components of the BIM device 100. For example, in one embodiment, the BIM device 100 is battery operated, and the power unit 160 comprises a rechargeable battery.

In one embodiment, the BIM device 100 is suitable for all-weather printing. For example, the BIM device 100 can be used to print in wet climates, hot climates, cold climates, and even in harsh weather conditions/inclement climates. In one embodiment, the BIM device 100 is suitable for printing on different types of surfaces, such as, but not limited to, substantially flat surfaces like form boards, irregular surfaces like lumber, plywood, and oriented strand boards, etc.

Figure 3:
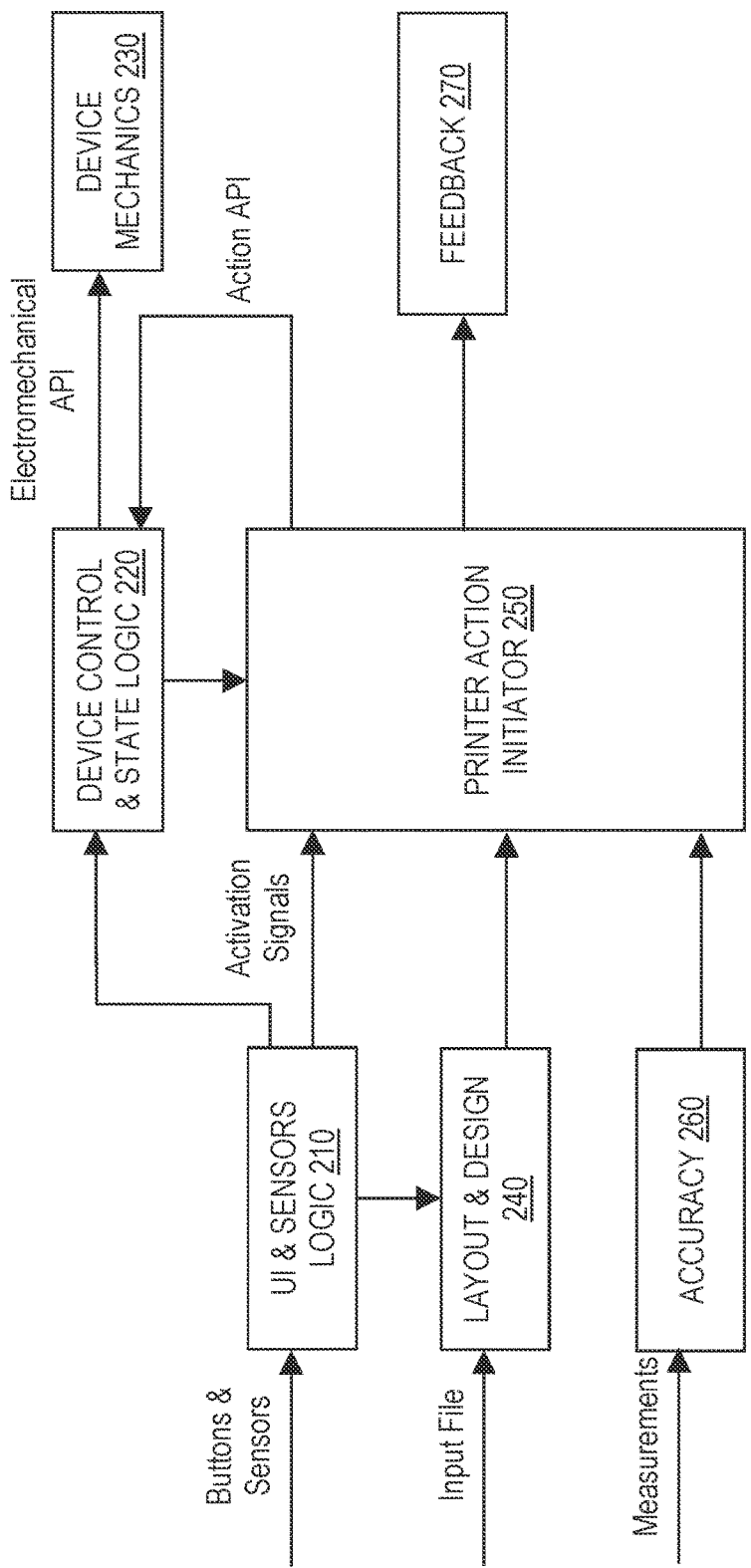
FIG. 3 illustrates an example precise placement system, in one or more embodiments.

FIG. 3 illustrates an example precise placement system 200, in one or more embodiments. In one embodiment, the system 200 comprises a user interface (UI) & sensors logic unit 210 configured to: (1) receive UI & sensor data captured by at least one I/O unit 130 and/or at least one sensor unit 140 of the BIM device 100, wherein the UI & sensor data is indicative of one or more detected physical interactions with the BIM device 100, (2) generate one or more activation signals in response to the one or more physical interactions detected, and (3) generate control data indicative of one or more adjustments/updates to a current state of the BIM device 100 (e.g., current operating mode of the BIM device, current configuration of the BIM device 100, etc.).

Examples of different detected physical interactions with the BIM device 100 include, but are not limited to, a mechanical interaction (i.e., mechanical actuation) with a movable/rotatable/adjustable member of the BIM device 100 (e.g., a user 30 mechanically/physically interacting with the BIM device 100 by applying hand/finger pressure to the BIM device 100 to roll the roller wheels 170A along a surface), a proximity interaction (e.g., the BIM device 100 is directly on top of a surface), a UI activation such as an actuation of a PUI (e.g., a user 30 interacting with a knob, a button, and/or another hardware I/O unit 130) or a GUI (e.g., a user 30 interacting with a touch screen and/or another software I/O unit 130).

In one embodiment, the system 200 comprises a device control and state logic unit 220 configured to provide an electromechanical application programming interface (API) for communicating with one or more mechanical parts ("device mechanics") 230 of the BIM device 100, such as the one or more movable units 170 and/or the printer unit 180. The device control and state logic unit 220 allows for the one or more device mechanics 230 to be controlled via the electromechanical API based on control data (e.g., from the UI & sensors logic unit 210 and/or from a printer action initiator 250).

In one embodiment, the device control and state logic unit 220 is configured to generate state data indicative of at least one of the following: a current state of the BIM device 100, or one or more recent actions performed by the BIM device 100.

In one embodiment, the system 200 comprises a layout and design unit 240 configured to: (1) receive an input file downloaded/loaded to the BIM device 100 or user selected from the one or more storage units 120, and (2) extract layout and design information from the input file.

In one embodiment, the system 200 comprises a printer action initiator 250 configured to control printing of the printer unit 180. The printer action initiator 250 provides an action API for communicating with the device control and state logic unit 220. The printer action initiator 250 allows for making one or more adjustments/updates to a current state of the BIM device 100 via the action API to control actions and behaviors of the printer unit 180.

In one embodiment, the printer action initiator 250 is configured to receive, as inputs, at least one of the following: (1) one or more activation signals from the UI and sensors logic unit 210, (2) state data from the device control and state logic unit 220, and (3) layout and design information from the layout and design unit 240. If the inputs received indicate that the BIM device 100 is in the print mode and the one or more movable units 170 of the BIM device 100 are in direct contact with a suitable surface onto which the printer unit 180 can print (e.g., detected via at least one sensor unit 140 of the BIM device 100), the precise placement system 200 is configured to trigger the printer unit 180 to simultaneously print as the BIM device 100 moves along the surface (e.g., via handheld movement by a user 30), based on the layout and design information, at least one of the following: (1) one or more layout markings on the surface, wherein each layout marking is indicative of a precise location of a piece of anchoring hardware to be embedded/installed with a small error tolerance (e.g., of about $1/16^{th}$ inch), and (2) one or more product identification (ID) markings on the same surface, wherein each product ID marking is positioned adjacent to a layout marking and identifies a particular piece of anchoring hardware (e.g., a type of anchoring bolt) to be embedded/installed at the layout marking.

In one embodiment, the system 200 comprises an accuracy unit 260 configured to ensure accuracy of printing of the printer unit 180. In one embodiment, the accuracy unit 260 is configured to receive one or more measurements from one or more sources indicative of a location of the printer unit 180 relative to a surface that the printer unit 180 is directly positioned on top of. For example, in one embodiment, each movable unit 170 (e.g., each roller wheel 170A) comprises an individual counter (e.g., a part counter typically used in CNC equipment) configured to provide counter information indicative of progress of the movable unit 170 as it moves (e.g., rolls) on top of a surface. The accuracy unit 260 is configured to receive counter information from each movable unit 170, and compare counter information for one movable unit 170 against counter information for another movable unit 170 to locate where the printer unit 180 should print markings on the surface, thereby ensure accuracy of printing. In one embodiment, the accuracy unit 260 is configured to detect a skip or a slippage as the movable units 170 move against the surface based on the comparison. In the event the accuracy unit 260 detects a skip or a slippage, the accuracy unit 260 alerts the printer action initiator 250 which in turn triggers the printer unit 180 to stop printing markings (via the action API). The device control and state logic unit 220 may trigger the one or more movable units 170 to stop moving (e.g., lock the roller wheels 170A) in response to the printer unit 180 stopping printing.

As another example, in one embodiment, the accuracy unit 260 utilizes laser technology (e.g., such as, but not limited to, laser measurement, laser balancing, laser leveling, etc.), instead of counters, to locate where the printer unit 180 should print markings on a surface, thereby ensure accuracy of printing. For example, a base plate can be fastened to a far corner of the surface that a laser of the BIM device 100 can use as a benchmark to read from and locate itself.

As yet another example, the accuracy unit 260 utilizes both laser technology and counters to locate where the printer unit 180 should print markings on a surface, thereby ensure accuracy of printing. For example, in one embodiment, the accuracy unit 260 is configured to triangulate a location of the BIM device 100 based on multiple measurements from multiples sources to ensure the accuracy of the printing, such as a measurement from a laser of the BIM device 100 (e.g., a measurement obtained using a base plate fastened to a far corner of the surface that the laser can use as a benchmark to read from and locate itself) and each measurement (i.e., counter information) from each counter in each movable unit 170.

In one embodiment, the system 200 comprises a feedback unit 270 configured to provide feedback alerting/warning a user 30 of an error so the user 30 can avoid erroneous markings. For example, if the accuracy unit 260 detects a skip or a slippage and the printer action initiator 250 triggers the printer unit 180 to stop printing markings in response to the skip or slippage detected, the printer action initiator 250 is configured to trigger the feedback unit 270 to provide one or more notifications via one or more I/O units 130 of the BIM device 100, such as a warning buzzer via a haptic feedback device or an audio reproduction device, a warning light via an indicator light, a warning message via a display screen, etc.

In one embodiment, the system 200 maintains one or more rules for controlling one or more actions and behaviors (e.g., printing speed, printing in color or black and white only, printing resolution, etc.) of the printer unit 180. For example, in one embodiment, one or more parameters controlling one or more actions and behaviors of the printer unit 180 are selectively adjusted/tuned based on sensor-based contextual information collected via at least one sensor unit 140 of the BIM device 100.

In one embodiment, the system 200 maintains one or more feedback rules for use in controlling when and type of feedback to generate and output via the feedback unit 270 based on sensor-based contextual information collected via at least one sensor unit 140 of the BIM device 100 (e.g., types of error notifications).

In one embodiment, the system 200 maintains one or more user permissions table corresponding to one or more users 30, wherein each user permission table maintains one or more user permissions for a corresponding user 30. In one embodiment, the printer action initiator 250 utilizes a user permissions table corresponding to a user to determine whether the user 30 is authorized to use the BIM device 100 (e.g., print markings via the BIM device 100).

FIG. 4A illustrates a side view of an example BIM device 100, in one or more embodiments. FIG. 4A illustrates a front view of the example BIM device 100, in one or more embodiments. In one embodiment, the printer unit 180 comprises an inkjet printhead 180A. In one embodiment, the one or more movable units 170 comprise roller wheels 170A. In one embodiment, the one or more I/O units 130 comprise a display screen 130A and an input port 130B (e.g., a USB port).

In one example application use, prior to concrete being poured, a user 30 can utilize the BIM device 100 to mark, on a top edge 10A of a form board 10, a correct location of each piece of anchoring hardware to be embedded in the concrete as well as a corresponding product ID of the piece of anchoring hardware. As shown in FIGS. 4A-4B, the BIM device 100 is positioned directly on top of the form board 10, such that the roller wheels 170A can roll along the top edge 10A of the form board 10.

In one embodiment, the BIM device 100 requires that a surface be clean before the printer unit 180 can print markings on the surface. For example, if a form board 10 is being re-used, the form board 10 can be spray painted before the printing to create a new clean surface on which the printer unit 180 can print markings. In one embodiment, at least on sensor unit 140 of the BIM device 100 can be used to detect dirt or other particles on the surface that makes it unsuitable to be printed on, and the feedback unit 270 can generate a notification alerting the user 30 of the detected particles.

Figure 5:
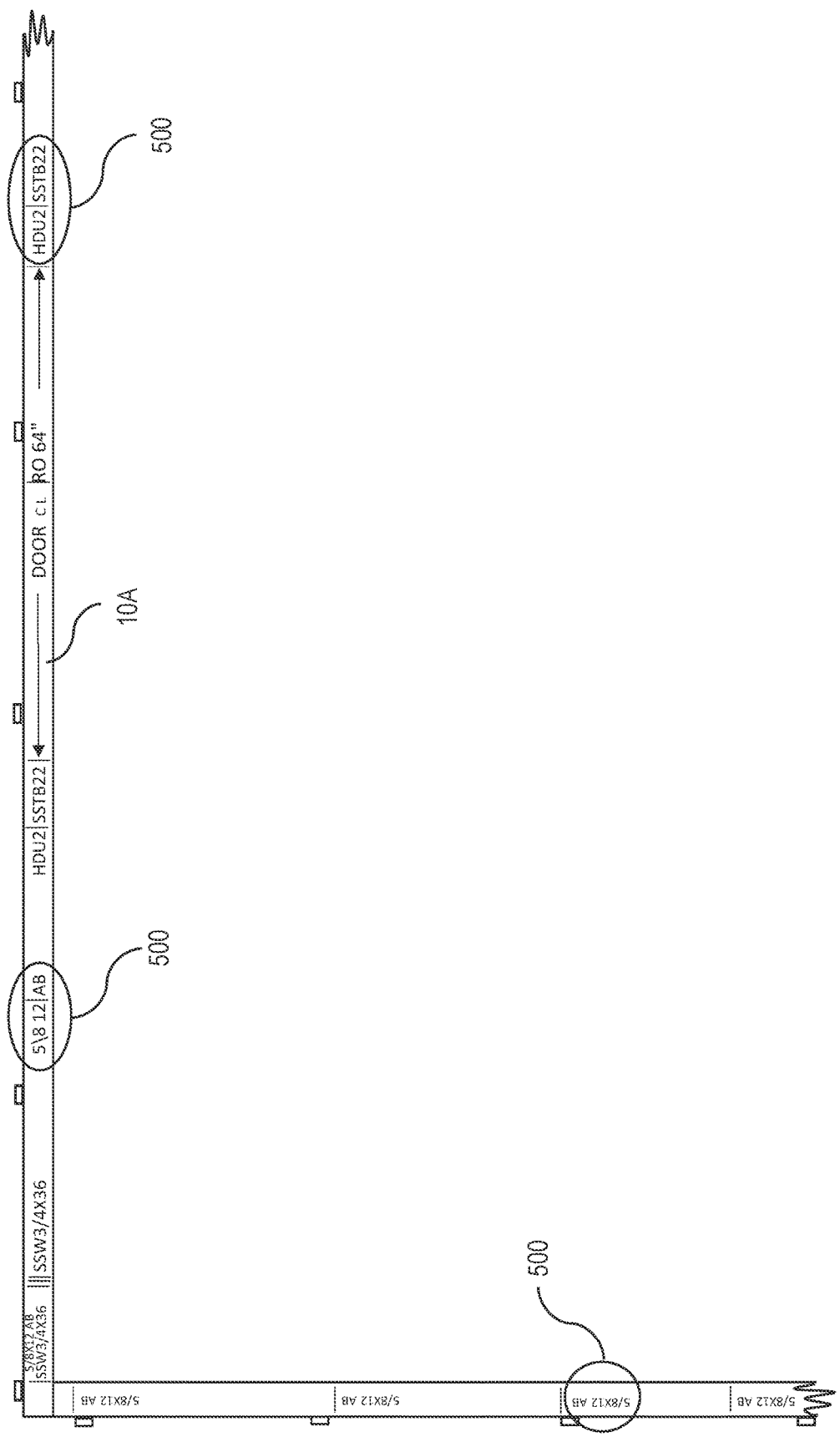
FIG. 5 illustrates example markings printed by the BIM device in FIGS. 4A-4B, in one or more embodiment.

FIG. 5 illustrates example markings 500 printed by the BIM device 100 in FIGS. 4A-4B, in one or more embodiments. The markings 500 on the top edge 10A of the form board 10 can include layout markings and product ID markings.

In another embodiment, the printer unit 180 comprises a strip printer instead. In the print mode, the precise placement system 200 is configured to trigger the strip printer to print, based on an input file, markings on non-stretching tape. Each object to be marked (e.g., each fully assembled wall) may be numbered and have a corresponding pre-printed roll of tape including markings printed by the strip printer. For each object, a solvent may be sprayed on a surface of the object (e.g., a top edge of a form board) that causes the adhesive on a corresponding pre-printed roll of tape to activate when the pre-printed roll of tape is unrolled and applied to the surface.

Structures that are built using stick framing can benefit from either embodiments (inkjet printhead or strip printer). For example, a user 30 can provide all pertinent information (e.g., anchors, hold downs, king posts, strong walls, etc.) into a software application used to design a fully assembled wall, and then download an input file generated by the software application to a BIM device 100 comprising either an inkjet printhead or a strip printer. Utilizing the BIM device 100 results in more accurate field-built structures.

Figure 6:
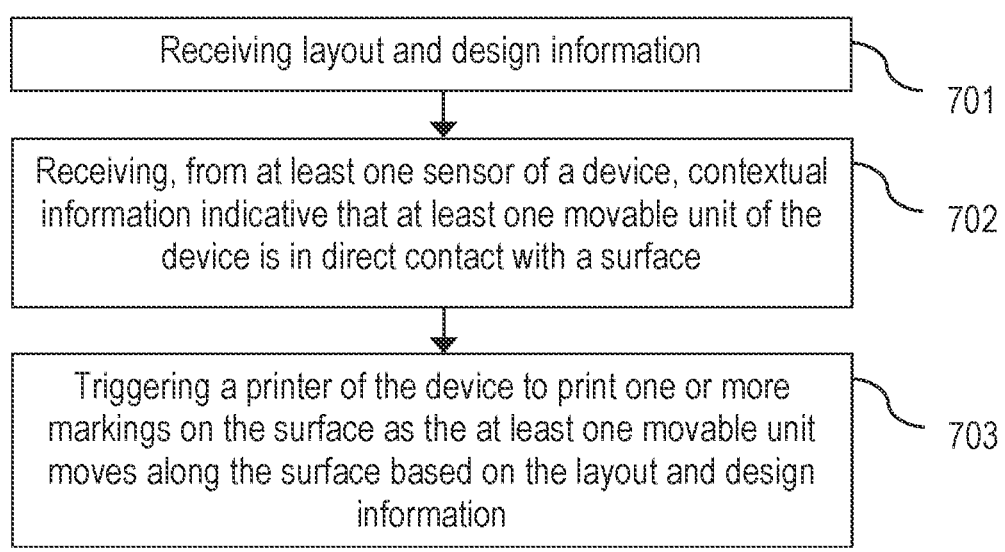
FIG. 6 illustrates a flowchart of an example process for implementing precise placement utilizing a portable handheld BIM device, in one or more embodiments.

FIG. 6 illustrates a flowchart of an example process 700 for implementing precise placement utilizing a portable handheld BIM device, in one or more embodiments. Process block 701 includes receiving layout and design information. Process block 702 includes receiving, from at least one sensor of a device (e.g., at least one sensor unit 140 of a BIM device 100), contextual information indicative that at least one movable unit of the device (e.g., at least one movable unit 170 of the BIM device 100) is in direct contact with a surface. Process block 703 includes triggering a printer of the device (e.g., a printer unit 180 of the BIM device 100) to print one or more markings on the surface as the at least one movable unit moves along the surface based on the layout and design information.

In one embodiment, process blocks 701-703 may be performed utilizing one or more components of the BIM device 100, such as the precise placement system 200.

Figure 7:
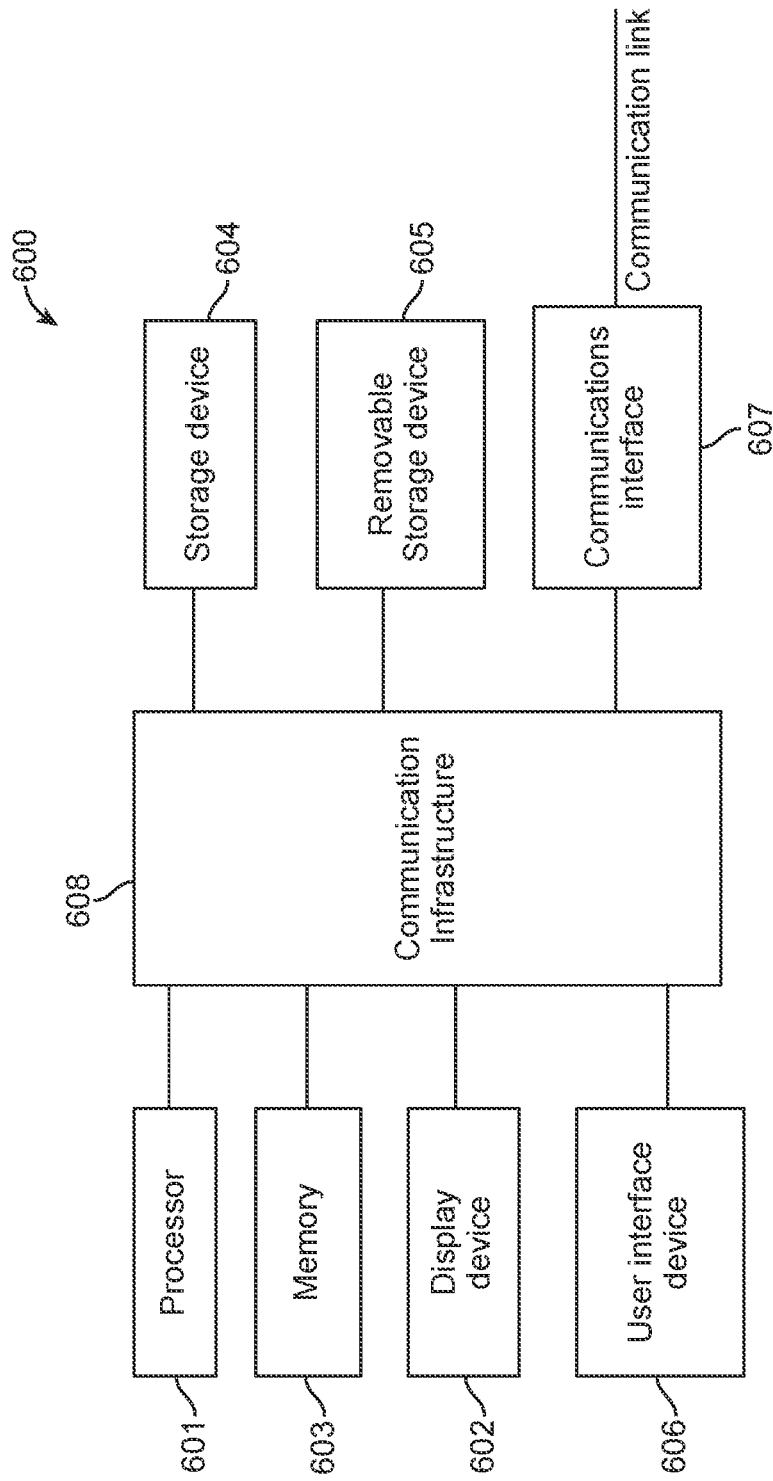
FIG. 7 is a high-level block diagram showing an information processing system comprising a computer system useful for implementing the disclosed embodiments.

FIG. 7 is a high-level block diagram showing an information processing system comprising a computer system 600 useful for implementing the disclosed embodiments. The system 200 may be incorporated in the computer system 600. The computer system 600 includes one or more processors 601, and can further include an electronic display device 602 (for displaying video, graphics, text, and other data), a main memory 603 (e.g., random access memory (RAM)), storage device 604 (e.g., hard disk drive), removable storage device 605 (e.g., removable storage drive, removable memory module, a magnetic tape drive, optical disk drive, computer readable medium having stored therein computer software and/or data), viewer interface device 606 (e.g., keyboard, touch screen, keypad, pointing device), and a communication interface 607 (e.g., modem, a network interface (such as an Ethernet card), a communications port, or a PCMCIA slot and card). The communication interface 607 allows software and data to be transferred between the computer system and external devices. The system 600 further includes a communications infrastructure 608 (e.g., a communications bus, cross-over bar, or network) to which the aforementioned devices/modules 601 through 607 are connected.

Information transferred via communications interface 607 may be in the form of signals such as electronic, electromagnetic, optical, or other signals capable of being received by communications interface 607, via a communication link that carries signals and may be implemented using wire or cable, fiber optics, a phone line, a cellular phone link, a radio frequency (RF) link, and/or other communication channels. Computer program instructions representing the block diagram and/or flowcharts herein may be loaded onto a computer, programmable data processing apparatus, or processing devices to cause a series of operations performed thereon to generate a computer implemented process. In one embodiment, processing instructions for one or more process blocks of process 700 (FIG. 6) may be stored as program instructions on the memory 603, storage device 604 and the removable storage device 605 for execution by the processor 601.

Embodiments have been described with reference to flowchart illustrations and/or block diagrams of methods, apparatus (systems) and computer program products. Each block of such illustrations/diagrams, or combinations thereof, can be implemented by computer program instructions. The computer program instructions when provided to a processor produce a machine, such that the instructions, which execute via the processor create means for implementing the functions/operations specified in the flowchart and/or block diagram. Each block in the flowchart/block diagrams may represent a hardware and/or software module or logic. In alternative implementations, the functions noted in the blocks may occur out of the order noted in the figures, concurrently, etc.

The terms "computer program medium," "computer usable medium," "computer readable medium", and "computer program product," are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

As will be appreciated by one skilled in the art, aspects of the embodiments may be embodied as a system, method or computer program product. Accordingly, aspects of the embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations for aspects of one or more embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of one or more embodiments are described above with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the embodiments has been presented for purposes of illustration and description, but is not intended to be exhaustive or limited to the embodiments in the form disclosed. Many modifications and variations will be apparent to those of ordinary skill in the art without departing from the scope and spirit of the invention.

Though the embodiments have been described with reference to certain versions thereof; however, other versions are possible. Therefore, the spirit and scope of the appended claims should not be limited to the description of the preferred versions contained herein.

What is claimed is:

1. A device comprising:
   a printer;
   at least one processor; and
   a non-transitory processor-readable memory device storing instructions that when executed by the at least one processor causes the at least one processor to perform operations including:
      receiving input data indicative of one or more locations on an object to mark;
      determining whether there is direct contact between a portion of the device and a surface of the object; and
      in response to determining there is direct contact between the portion of the device and the surface, triggering the printer to print one or more markings on the surface based on the input data as the portion of the device moves directly along the surface, wherein the resulting one or more markings printed on the surface correspond to the one or more locations on the object.

2. The device of claim 1, wherein the object comprises one of a form board, lumber, plywood, an oriented strand board, concrete, or a wall.

3. The device of claim 1, wherein the one or more markings printed on the surface comprise a layout marking indicative of a location on the surface to anchor a structure and an error tolerance corresponding to the location.

4. The device of claim 1, wherein the one or more markings printed on the surface comprise a layout marking indicative of a location on the surface to embed or install a piece of hardware and an error tolerance corresponding to the location.

5. The device of claim 4, wherein the one or more markings printed on the surface further comprise a product identification (ID) marking positioned adjacent to the layout marking and identifying the piece of hardware to embed or install at the layout marking.

6. The device of claim 4, wherein the piece of hardware comprises at least one of: an anchor bolt, a hold down device, a king post, a strong wall, a stud, or a strap.

7. The device of claim 1, wherein the operations further comprise:
   determining whether the portion of the device skips or slips as the portion of the device moves along the surface; and
   in response to determining the portion of the device skips or slips, triggering the printer to stop printing the one or more markings on the surface.

8. A method comprising:
   receiving input data indicative of one or more locations on an object to mark;
   determining whether there is direct contact between a portion of a device and a surface of the object, wherein the device comprises a printer; and
   in response to determining there is direct contact between the portion of the device and the surface, triggering the printer to print one or more markings on the surface based on the input data as the portion of the device moves directly along the surface, wherein the resulting one or more markings printed on the surface correspond to the one or more locations on the object.

9. The method of claim 8, wherein the object comprises one of a form board, lumber, plywood, an oriented strand board, concrete, or a wall.

10. The method of claim 8, wherein the one or more markings printed on the surface comprise a layout marking indicative of a location on the surface to anchor a structure and an error tolerance corresponding to the location.

11. The method of claim 8, wherein the one or more markings printed on the surface comprise a layout marking indicative of a location on the surface to embed or install a piece of hardware and an error tolerance corresponding to the location.

12. The method of claim 11, wherein the one or more markings printed on the surface further comprise a product identification (ID) marking positioned adjacent to the layout marking and identifying the piece of hardware to embed or install at the layout marking.

13. The method of claim 11, wherein the piece of hardware comprises at least one of: an anchor bolt, a hold down device, a king post, a strong wall, a stud, or a strap.

14. The method of claim 8, further comprising:
determining whether the portion of the device skips or slips as the portion of the device moves along the surface; and
in response to determining the portion of the device skips or slips, triggering the printer to stop printing the one or more markings on the surface.

15. A device comprising:
a strip printer;
at least one processor; and
a non-transitory processor-readable memory device storing instructions that when executed by the at least one processor causes the at least one processor to perform operations including:
receiving input data indicative of one or more locations on an object to mark; and
triggering the strip printer to print one or more markings on a tape strip based on the input data, wherein the tape strip including the resulting one or more markings printed on the tape strip is applied to a surface of the object, and the one or more markings printed on the tape strip applied to the surface correspond to the one or more locations on the object.

16. The device of claim 15, wherein the object comprises one of a form board, lumber, plywood, an oriented strand board, concrete, or a wall.

17. The device of claim 15, wherein the one or more markings printed on the tape strip comprise a layout marking indicative of a location on the surface to anchor a structure and an error tolerance corresponding to the location.

18. The device of claim 15, wherein the one or more markings printed on the tape strip comprise a layout marking indicative of a location on the surface to embed or install a piece of hardware and an error tolerance corresponding to the location.

19. The device of claim 18, wherein the one or more markings printed on the tape strip further comprise a product identification (ID) marking positioned adjacent to the layout marking and identifying the piece of hardware to embed or install at the layout marking.

20. The device of claim 18, wherein the piece of hardware comprises at least one of: an anchor bolt, a hold down device, a king post, a strong wall, a stud, or a strap.

* * * * *